United States Patent

[11] 3,542,437

[72] Inventors: Heinz Leiber
Leimen;
Hartwig Steusloff, Edingen, Germany
[21] Appl. No. 743,400
[22] Filed July 9, 1968
[45] Patented Nov. 24, 1970
[73] Assignee Teldix Gesellschaft mit beschrankter Haftung
Heidelburg-Wieblingen, Germany
[32] Priority Aug. 3, 1967
[33] Germany
[31] No. T 34 493

[54] BRAKE CONTROL SYSTEM FOR PREVENTING WHEEL LOCKING
14 Claims, 10 Drawing Figs.

[52] U.S. Cl. .................................................... 303/21, 303/20
[51] Int. Cl. ....................................................... B60t 8/08
[50] Field of Search .......................................... 303/21A4, BE, BB, CE

[56] References Cited
UNITED STATES PATENTS
3,398,995 8/1968 Martin ................... 303/21(A4)UX Primary Examiner—Duane A. Reger
Attorney—Spencer & Kaye ABSTRACT: An improvement in a fluid actuated brake system for applying a braking force to a wheel in such a way as to prevent wheel locking. The system includes a source of fluid pressure connected to a wheel brake, a sink of fluid pressure connected to the wheel brake, an inlet valve connected between the source and the wheel brake for selectively preventing the fluid pressure from the source from reaching the wheel brake, an outlet valve connected between the sink and the wheel brake for selectively permitting the fluid pressure from the wheel brake to escape to the sink, and control means connected to the inlet valve and to the outlet valve for selectively closing the inlet valve and opening the outlet valve to selectively hold constant and reduce the braking force applied to the wheel. The improvement includes the provision, in the control means, of a bistable device, switchable between two stable states, for closing the inlet valve and opening the outlet valve when in a first state to reduce the braking force applied to the wheel, as well as means for switching the bistable device into the first state when the rotational deceleration of the wheel exceeds a first threshold and means for switching the bistable device into the second state when the rotational acceleration of the wheel exceeds a second threshold.

Patented Nov. 24, 1970

NORMAL

DECELERATION

WEAK ACCELERATION

STRONG ACCELERATION

INVENTORS.
Heinz Leiber
Hartwig Steusloff

BY *Spencer & Kaye*
ATTORNEYS.

INVENTORS.
Heinz Leiber
Hartwig Steusloff
BY Spencer & Kaye
ATTORNEYS.

BRAKE CONTROL SYSTEM FOR PREVENTING WHEEL LOCKING

CROSS-REFERENCE TO RELATED APPLICATION

The subject matter of this application is related to that disclosed in copending U.S. Pat. application Ser. No. 686,492, filed Nov. 29, 1967, by Heinz Leiber, now U.S. Pat. No. 3,498,683 issued Mar. 3, 1970.

BACKGROUND OF THE INVENTION

The present invention relates to a so-called three-point brake control system for preventing wheel locking in fluid actuated vehicle brakes. This type of brake control system, which is disclosed in the copending application referred to above, controls the brake pressure applied to a vehicle wheel by switching individually actuatable solenoid valves in response to the rotational deceleration and the rotational acceleration of the wheel.

As the name "three-point brake control system" implies, there are three possible switching combinations of the two solenoid valves. These valves, which are arranged as an inlet valve to and an outlet valve from a wheel brake, may be switched so that the inlet valve will be closed and the outlet valve open. In this first switching combination the brake pressure applied to the wheel is reduced.

It is possible also to close both the inlet and outlet valves so that the brake pressure applied to the wheel will remain substantially constant. In this second combination of valve settings the brake pressure may also be made to slowly increase, for reasons which need not be considered in detail here, by bypassing the inlet valve with a brake fluid-restricting shunt. The brake pressure can nevertheless be considered to be substantially constant since, in any case, the increase in brake pressure is an order of magnitude smaller when the inlet valve is closed than when it is open.

In a third combination of valve settings, which will be designated as the "normal" combination in the discussion that follows, the inlet valve is open and the outlet valve closed. In this combination the brake pressure can rise and, if the valves are maintained in this combination for a sufficient time, the brake pressure will reach the so-called "prepressure," , i.e. the pressure determined by the driver of the vehicle.

It has already been proposed that such a brake control system be employed to drop the brake pressure applied to the wheel in response to excessive rotational deceleration of the wheel and to maintain the brake pressure at a constant low level for a time which is dependent upon the rotational acceleration of the wheel. In the time between the moment when the rotational deceleration switch has been turned off (deceleration threshold no longer exceeded), and the moment when the rotational acceleration switch is turned on (acceleration threshold not yet exceeded), the brake pressure is also maintained at this constant low level by means of a short time delay switch that shunts the deceleration switch.

Tests have shown that if this type of brake control system be adjusted so that it will function especially well on dry pavements and will prevent the wheels of a vehicle from locking up to a time just shortly before the vehicle comes to a standstill (and, thus, reduces the braking distance of the vehicle from what it would be were the vehicle wheels locked), the brake control system will not operate satisfactorily when the friction between wheels and pavement are very low, e.g., when the surface of the pavement is covered with ice. This phenomenon is caused by the fact that the reduction in pressure is not completed exactly at the moment when the rotational deceleration of the vehicle wheels falls below the given threshold value; the brake pressure is reduced, rather, somewhat later.

In the first place, if mechanical means are provided to sense the rotational deceleration of the vehicle wheel or wheels, the inertia wheel of this sensor requires some time to move an angular distance with respect to the rotating member driven by the wheel and to open the corresponding electrical contact. But even if the rotational deceleration sensor does not operate mechanically, it still takes a few milliseconds of time to change the magnetic field and move the armature of the brake pressure-reducing solenoid valve. Finally, when the solenoid valve is open, the mass moment of inertia of the pressure medium—the hydraulic fluid, for example—prevents the reduction in pressure from occurring instantaneously. All of these individual delaying effects can be added together, for the purposes of this explanation, and designated as the "dead time" of the control system for preventing wheel locking. This dead time, which acts to extend the time between the moment when the deceleration phase is initiated and the moment when the brake pressure is finally reduced, is, for all practical purposes, a constant of the system.

When a vehicle having a brake control system for preventing wheel locking with a certain dead time is driven onto iced pavement, the system operates deficiently. Depending on the nature of the pavement, however, the system can operate in two different ways, each of which brings about the deficient operation for a different reason.

In the first case, the vehicle is braked while being driven on dry pavement which abruptly changes to a surface of slippery ice. Required here is that the brake pressure, which at first is high in correspondence with the high coefficient of friction of the dry pavement, be reduced by the brake control system to a very low value after the rotational deceleration phase. In this case, the dead time, which has been adjusted to meet the requirements of driving on normal streets having relatively low variations in their coefficients, is not sufficient to handle this especially large variation in the coefficient of friction.

If, on the other hand, the vehicle is initially braked on a street which is substantially covered with ice, no particularly large reductions in pressure will be necessary. In this case, however, the so-called initial that is, the brake pressure from which a reduction is required—is relatively low and, for reasons that follow, likewise results in too small a reduction.

As is known, it is necessary that control systems for preventing wheel locking operate within a relatively large range of pressures. In passenger vehicles having hydraulic brakes the initial pressure can move, for example, between 15 and 160 atmospheres. If the brake pressure be plotted against time from the moment the outlet valve is opened, though the curve be dependent upon many operating variables (especially from the temperature), it will generally fall very steeply when the pressure is high and then flatten out—that is, fall at a slower rate—as the pressure in the brake system is reduced. It can be seen, therefore, that the reduction in pressure during the dead time will be considerably greater if the initial pressure is high than if it is low. This means that the system for preventing wheel locking will be basically more "sensitive" and will react quicker and more effectively at high initial pressures than at low initial pressures.

By readjusting the dead time it is possible, if necessary, to achieve a relatively favorable compromise. In general, however, every improvement in the control behavior of the control system while the vehicle is braked on ice which is achieved in this way will decrease the effectiveness of the control behavior on dry pavements, and vice versa.

SUMMARY OF THE INVENTION

An object of the present invention, therefore, is to improve the brake control system for preventing wheel locking of the type described above so that it will operate with full effectiveness with dry as well as with slippery or icy pavements.

This as well as other objects which will become apparent in the discussion that follows is achieved, according to the present invention, by providing a bistable switching device which switches into one stable state causing the inlet valve to close and the outlet valve to open (pressure reduction valve combination) when the rotational deceleration of a wheel of the vehicle being braked exceeds a first threshold and which switches back to its normal stable state only when the rotational acceleration of the wheel exceeds a second threshold. The braking force is thus reduced, after the wheel exceeds the rotational deceleration threshold, not for a fixed time longer, but just so long until the wheel again attains a certain rotational acceleration.

The bistable device according to the present invention ensures that the reduction in the brake pressure applied to the wheel will always be sufficient to allow the wheel to obtain traction again. Even when the wheel should in fact come to a standstill, for example after passing from a dry to an icy pavement, the pressure will be reduced for a sufficiently long time to allow the wheel to rotate again even though the coefficient of friction between the wheel and the ice becomes extremely small. With the brake control system for preventing wheel locking without a bistable device as suggested by the present invention, once a wheel became locked, it would remain locked.

In the brake control system which has previously been suggested, the pressure in the brake system is allowed to remain constant, after reduction, until the end of the acceleration phase. To accomplish this with the apparatus of the present invention, it is necessary to provide a rotational acceleration switching device which provides an electrical contact at the latest when the bistable switching device flips back to its normal state and causes both the inlet and outlet valves to be closed (constant pressure-valve combination). It would be most advantageous, according to a further embodiment of the rotational acceleration switching device, if the contacts of this device were made to open after the wheel has exceeded an upper rotational acceleration threshold value so as to cause the inlet valve to open and the outlet valve to remain closed (normal valve setting combination) and allow the brake pressure to increase again. A very high acceleration of the wheel is, in fact, a sign that the brake pressure was too low. The brake pressure would therefore be "stepped" somewhat so that the wheel would obtain the rotational speed which results in the highest braking force without overshooting.

In a mechanical rotational deceleration switching device having an inertia wheel and a contact actuated thereby, this feature can be realized by providing two friction contacts (wiper contacts) arranged to tangentially brush against each other and close an electrical circuit within a certain angular region.

The bistable switching device may be realized, for example, by a rocker arm which is acted upon by the inertia wheel and by holding forces which keep it in one of two stable positions. The rocker arm can be provided with an electrical contact which closes when the arm is in one of its two positions. The rocker arm may be moved by two followers fastened to the inertia wheel and arranged a given distance away and on both sides of the arm.

It is important that the rocker arm not be allowed to remain in its unstable middle position as could occur, for example, if the inertia wheel were to move it to its middle position and then rotate back again. If this happened, it is possible that the rocker arm would not move back with the inertia wheel but, as a result of its own inertia and vibrations, be caused to flip to its other stable state and initiate a reduction in the brake pressure. In addition—assuming that the rocker arm torque is relatively large compared to the restraining moment of the inertia wheel—a relatively weak rotational deceleration, which lies far below the intended threshold value, could bring the flipping process to an end by the inertia wheel if it occurred after the flipping process had started.

In both cases, therefore, it would be possible for the bistable device to initiate a reduction in the brake pressure at the wrong time. For this reason, there is provided an elastic coupling between the rocker arm and the inertia wheel. This coupling, according to the present invention, effectively prevents this occurrence.

It is possible, further, to provide, as the bistable switching device, a double coil relay which operates in the following manner. When one coil, a so-called "holding coil," is excited, the relay armature is drawn to one stable state where it operates the necessary contacts to reduce to the brake pressure. The armature is held in this position since another contact ensures that the holding coil will continue to receive excitation current. However, as soon as a second coil, a so-called "restoring coil," becomes excited, the armature of the relay is drawn away from the holding coil and falls back to and remains in this normal position or state.

With systems that are designed to operate with electronic signals, it is preferable to use a transistorized bistable trigger circuit of the type known as a bistable multivibrator or flip-flop.

Braking tests of the brake control system according to the present invention made with a recording instrument that graphs the rotational speed of the wheel have disclosed large variations in the way in which the wheel accelerates to the speed of the vehicle after the brake pressure has been reduced. It has been shown, for example, that the speed of the wheel often increases in a stepwise fashion; that is, as a result of oscillations in the wheel acceleration. The cause of this nonuniformity in the wheel behavior can be traced to the operation of the system after the wheel has exceeded the acceleration threshold and caused the outlet valve to close. Depending on the conditions of the pavement, it is possible for the rotational acceleration of the wheel to fall again, shortly thereafter, to a value below the threshold value of acceleration of the system causing the inlet valve to open. This can happen several times; each time the inlet valve is made to open, the brake pressure increases again. This may result too early in a new deceleration of the wheel, i.e. in a new brake regulating cycle.

The stepwise or rather spasmodical increase in the rotational speed of the wheel is, however, a good sign that the brake control systems has adjusted to exactly the right brake pressure; that is, the brake pressure which provides the wheels with the most favorable stopping friction. It is desirable, therefore, to prevent this pressure from immediately changing again. For this reason, the brake control system for preventing wheel locking is provided, according to a further embodiment of the present invention, with a monostable multivibrator or flip-flop that holds the inlet valve closed, independently of the operation of the rotational acceleration sensor, for a prescribed time, for example 25 milliseconds, after the bistable flip-flop has been switched back to its initial state.

The brake control system having a bistable flip-flop, according to the present invention, must also be made to handle the cases wherein a rotational deceleration of the wheel, sufficient to flip the flip-flop into the state that causes a reduction of pressure, is not followed by a rotational acceleration or is followed by only so small an acceleration that the flip-flop is not returned to its initial state. These conditions can occur, in particular, if the brake control system initiates a cycle just before the vehicle wheel comes to a standstill with a jolt. The rotational acceleration of the wheel resulting from the subsequent acceleration of the vehicle by the driver is usually insufficient to return the flip-flop to its initial state. Were the brakes applied by the driver after the vehicle had again reached full speed, the flip-flop would still be in this "reduce pressure" state (inlet valve closed; outlet valve open) and would prevent any effective buildup of brake pressure at the wheel.

It is necessary also to take into account the rare case wherein, while the vehicle is braked, the wheel undergoes a very short but strong rotational deceleration which flips the bistable flip-flop, and then acquires the vehicle speed again with a very low rotational acceleration that lies below the threshold value of the rotational acceleration sensor allowing the bistable flip-flop to remain in the "reduce pressure" state. These conditions could occur, for example, if the brake pressure happened to drop just to that point where the braking moment approximately balanced the moment of friction between the wheel and the pavement, or when the coefficient of friction between the wheel and the pavement happened to change to a value corresponding to the braking moment just after the brake pressure was reduced. In both these cases, the circumferential speed of the wheel would very slowly increase to the speed of the vehicle while the brake pressure would continue to drop to and stay at zero.

This problem is solved, per a further embodiment of the control system for preventing wheel locking according to the present invention, by providing precautionary measures for flipping the bistable flip-flop back into its initial or normal state when the brake pressure fails. The term "brake pressure," as used here, should be understood to mean the regulated brake pressure appearing at the wheel cylinder, and not in the "prepressure" determined by the driver of the vehicle, as defined in the "Background of the Invention" above.

The restoration of the bistable flip-flop to its initial state is preferably made dependent upon the operation of the switch which controls the power supplied to the entire control system for preventing wheel locking, be it at the moment that the power is switched off or when it is switched on again. A brake pressure switch which turns the power on and off in response to the controlled brake pressure applied to the wheel may be employed for this purpose. The switching point of the pressure switch can be made to coincide with the presence of the pressure required to lay the brakeshoes against the brake drum or disc of the wheel so that the power supplied to the control system will be switched off the moment the brake pressure falls below this point.

If a relay is employed as a bistable device, its armature will clearly fall into the initial or normal position of the relay by the force of its return spring. If an electronic flip-flop is used, it may be designed to assume a particular state whenever the power is applied to it again. And if a rocker arm is made to serve as the bistable device, it is suggested that a restoring lever be provided that will push the rocker arm into its normal state by the force of a spring. This restoring lever can then be swung against the force of the spring out of the way of the rocker arm by means of an electromagnet when the power is applied to the brake control system.

To realize the invention which is generally described above, it is suggested that a mechanical sensor having a rotating inertia wheel be used to actuate "real" contacts in dependence upon the rotational deceleration or acceleration of the wheel. This type of sensor has proven reliable in practice and will therefore be referred to in the "Description of the Preferred Embodiments" below. It should be remembered, however, that the brake control system according to the present invention is not limited to the use of a mechanical sensor. It is possible, rather, to use any type of sensor, including purely electrical devices, provided the "switching circuits" (used in the broadest sense) are similarly controlled in dependence upon the rotational acceleration and deceleration of the wheel.

The expression "contact" will be used in the discussion that follows for the sake of simplicity. It will be understood, however, that this term is in no way intended to limit the invention to devices using actual mechanical contacts.

DESCRIPTION OF THE PREFERRED EMBODIMENTS

Figure 1:
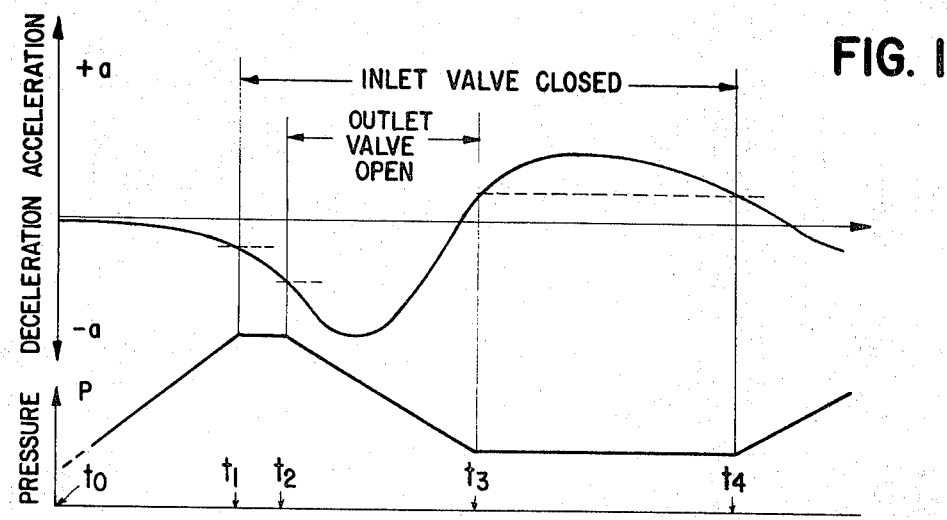
FIG. 1 is a diagram showing the relationship between the first derivative of the speed of the wheel and the brake pressure during a control cycle of the brake control system for preventing wheel locking according to the present invention.

Referring now to the drawings, FIG. 1 shows an exemplary graph of the rotational acceleration ($+a$) and the rotational deceleration ($-a$) of a braked wheel against time for a vehicle equipped with the control system for preventing wheel locking according to the present invention. The lower portion of FIG. 1 shows the brake pressure P which is applied to the wheel brake cylinder at corresponding moments in time. Also designated on the graph are the periods in which the normally open inlet valve of the control system for preventing wheel locking is closed and the normally closed outlet valve is open.

As may be seen from the graph of FIG. 1, the outlet valve of the brake control system opens after the wheel attains a given value of rotational deceleration ($-a$). This allows the brake pressure P to fall. In contrast to the brake control systems which are described in the related copending application referred to at the beginning of this specification, the outlet valve is caused to remain open, according to the present invention, and allow the pressure to fall, until the rotational acceleration of the wheel exceeds a certain threshold (time $t_3$). The inlet valve which is caused to close at a time $t_1$ just prior to the time $t_2$ when the outlet valve is opened, is held closed to keep the brake pressure constant at the reduced level until the rotational acceleration of the wheel falls below the given threshold. At this time $t_4$ the inlet valve is opened again, to allow the brake pressure in the hydraulic line to reach the wheel cylinder.

The mechanical rotational acceleration/deceleration sensor shown in FIGS. 2, 3, 4 and 5 includes a driving member 1 in the form of a round plate which is arranged to rotate about its axis and is connected to be driven by the vehicle wheel. The driving member is surrounded by a coaxial "inertia wheel" 2 which is mounted about the driving member 1 with ball bearings 3, 4 and 5 in such a way that it can rotate back and forth with respect to the driving member 1.

FIGS. 2—5 are basically schematic diagrams which are primarily designed to show the operation of the mechanical sensor. It is to be understood, for example, that the actual bearings of the sensor are not limited to ball bearings but may be designed and realized in any manner known in the art.

The driving member 1 is provided with a rocker arm 6 that is arranged to swivel about an axis 7 that is parallel to the rotational axis of the member 1. A pulling spring 8 is attached to the upper half of the rocker arm 6 and causes the arm to swing to the right or to the left depending on whether the line along which it applies its force runs to the right or to the left of the arm axis 7. A U-shaped flat spring 9 is fastened to the lower half of the rocker arm 6 and extends in the upward direction for a distance substantially equal to the length of the rocker arm. The upper free ends of the rocker arm 6 and the flat spring 9 enclose an inwardly projecting catch 10 of the inertia wheel 2. The pulling spring 8 of the rocker arm is sufficiently strong to cause the rocker arm to tilt against the force of the flat spring 9.

The inertia wheel also has a right catch 11 similar to and arranged a given distance from the left catch 10 on the opposite side of the rocker arm 6. The two catches 10 and 11 of the inertia wheel are designed to come in direct contact with the rocker arm and flip it to its opposite state in spite of the force of the spring 8.

Figure 2:
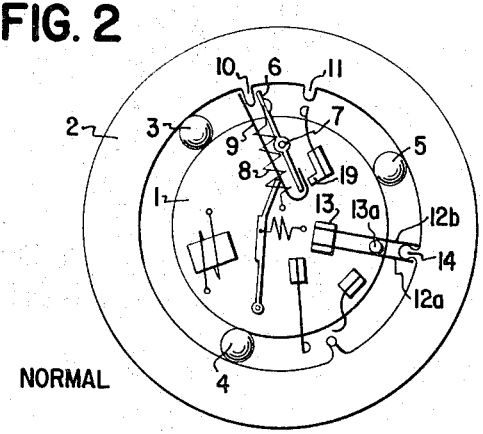
FIG. 2 is a schematic diagram of a mechanical device for sensing accelerations and decelerations of a vehicle wheel which includes a bistable device according to the present invention. This mechanical sensor is shown in its normal position.

In its normal position, shown in FIG. 2, the lower end of the rocker arm abuts a limit stop 19. The angular position of the inertia wheel is controlled by two flat springs 12a and 12b which are fastened to the driving member 1 by means of a common clamping block 13. These springs 12a and 12b lie in tension against a pin stop 13a attached to the driving member and enclose, between them, a projection 14 on the inertia wheel 2.

Figure 3:
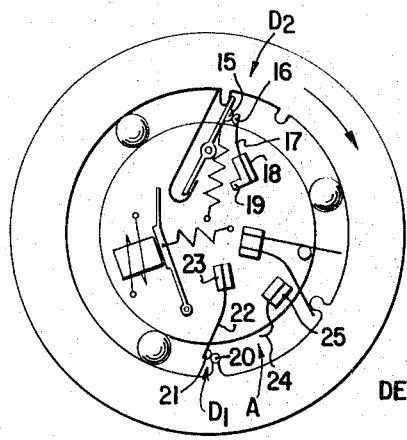
FIG. 3 is a schematic diagram of the mechanical sensor of FIG. 2 shown in the position it assumes during the deceleration of the vehicle wheel.

The electrical contact elements are numerically designated on the sensor shown in FIG. 3. A contact bead 15 is fastened to the rocker arm and arranged to coact with a contact bead 16 on a contact spring 17. The clamping block of this spring 17 is designated with the numeral 18 and serves, simultaneously, as the limit stop 19 for the rocker arm. The contact beads 15 and 16 will be referred to as a unit as the "second deceleration contact" or the D2-contact, in the discussion that follows.

A round contact bead 20 is attached to a projection on the inertia wheel and arranged approximately diametrically opposite to the D2-contact. This bead 20 cooperates, on one hand, with a contact bead 21 and, on the other, with a contact spring 24. The contact bead 21 is mounted on the end of a contact spring 22 which is fastened to the driving member 1 by a clamping block 23. The contact spring 24 is bent in the form of a hook and fastened to the driving member by means of a clamping block 25. The contact beads 20 and 21 form what will be referred to below as the "first deceleration contact," the D1-contact, while the contact bead 20 and the contact spring 24 together form what will be called the "acceleration contact," or the A-contact. The contact spring 24 is constructed as a "wiper contact;" that is, it is arranged to brush across and move past the contact bead 20.

Figure 4:
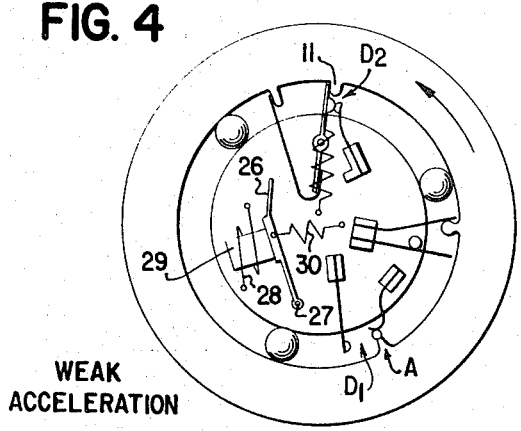
FIG. 4. is a schematic diagram of the mechanical sensor of FIG. 2 shown in the position it assumes prior to tripping the bistable device while the wheel undergoes weak rotational acceleration.

A restoring lever 26 is specifically designated in the sensor shown in FIG. 4. This lever is arranged to rotate about a pin 27 that is fastened to and rotates with the driving member. The central portion of the restoring lever is constructed as a magnet armature and is arranged to be drawn by the field of a magnet 29 when the magnet winding 28 is excited. When no current is applied to the winding 28, the restoring lever is pulled so far to the right by a return spring 30 that it comes in contact with the lower part of the U-spring 9, as shown in FIG. 2, and swivels the top of rocker arm 6 toward the left.

FIGS. 2, 3, 4 and 5 illustrate the various configurations assumed by the sensor when the wheel to which the driving member 1 is attached is rotating under normal conditions, is decelerating, is weakly accelerating and strongly accelerating, respectively. The operation of the various contacts and their effect upon the remaining portion of the brake control system for preventing wheel locking will be described in detail below.

Figure 5:
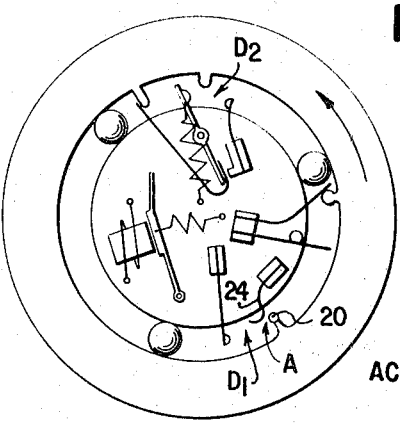
FIG. 5 is a schematic diagram of the mechanical sensor of FIG. 2 in the position it assumes when the wheel experiences a strong rotational acceleration.
Figure 6:
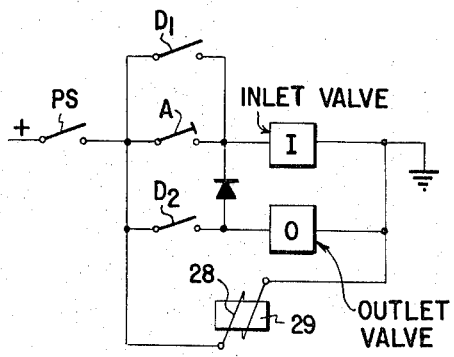
FIG. 6 is a schematic diagram of the electric circuit portion of a control system for preventing wheel locking, according to one embodiment of the present invention, which employs the sensor shown in FIGS. 2 through 5.

FIG. 6 illustrates a circuit diagram which may be used with the mechanical sensor shown in FIGS. 2 through 5 to operate the inlet and outlet valves of the brake control system. The positive terminal of a voltage source, which, in practice, is normally the positive terminal of the automobile battery, is connected through a pressure switch to the three contacts $D_1$, A and $D_2$ of the sensor. The pressure switch, which may be of the type normally used in automobiles as a brake light switch, is hydraulically connected on the wheel brake cylinder side of the inlet valve of the vehicle so that the effective regulated hydraulic brake pressure will be applied thereto. The electric contacts of the pressure switch are normally open in the absence of hydraulic pressure. This switch effectively opens the electric circuit of the brake control system, therefore, both when the vehicle is not braked and when the outlet valve of the brake control system has remained open so long that the brake pressure applied to the wheel cylinder has sharply fallen.

The contacts $D_1$ and A lie parallel to each other and in series with the inlet valve I. The contact $D_2$ lies in series with the outlet valve O and is additionally connected to the inlet valve through a diode 30. The pressure switch PS is also connected directly to the winding 28 of the sensor magnet 29. Both the valves I and O as well as the magnet winding 28 are connected to ground.

The fluid connection of the inlet valve I and the outlet valve O in the hydraulic brake system is both shown and described in the related copending application referred to at the beginning of the specification. Briefly, when the inlet valve is in its normal (unexcited) position, it is open and allows the brake "prepressure," generated when the driver of the vehicle applies the brakes, to reach the wheel brake cylinder of the particular wheel that is being controlled. When the outlet valve is in its normal (unexcited) position, it is closed and prevents the pressure medium from being bled off from the wheel brake cylinder. When the outlet valve is excited, it opens a path from the wheel brake cylinder to a return line, a storage chamber or, in the case of air brake systems, to the ambient air.

The control system for preventing wheel locking which is illustrated in FIGS. 2, 3, 4, 5 and 6 operates, with reference to the graph of FIG. 1, in the following manner. It is assumed, at the outset, that the vehicle is initially moving forward at an approximately constant speed. Under this condition, the driving member 1 and the inertia wheel 2 rotate together as a unit with their angular positions arranged relative to each other as shown in FIG. 2. Since the sensor magnet winding 28 will be unexcited, the restoring lever 26 is free to swivel the rocker arm 6 to its left-hand stable state. All the contacts of the sensor will be open.

When the driver brakes the vehicle, say at time $t_0$, the brake pressure P will rise as shown in the initial portion of the graph of FIG. 1. After the pressure reaches only a few atmospheres, the pressure switch PS will close and cause voltage to be applied to the contacts $D_1$, A and $D_2$ as well as to the sensor magnet winding 28. The magnet 29 will then draw the restoring lever 26 away from the rocker arm 6.

As the braking force acting upon the vehicle wheel causes it to decelerate, the inertia wheel of the sensor will begin to rotate toward the right with respect to the driving member 1 as indicated by the arrow in FIG. 3. The projection 14 will cause the flat spring 12a to bend and move with it and the catch 10 will force the top of the rocker arm toward the right. If the "prepressure" set by the driver is slightly high for the conditions of the road, the rotational deceleration of the wheel being sensed will increase to the point where the D1-contact and, in turn, the inlet valve will close and cause the brake pressure to hold at a constant level. At this instant, which is time $t_1$ in FIG. 1, the rocker arm 6 will have been rotated to a point just ahead of its central or flipping point. If the rotational deceleration of the wheel increases no further—that is, if the wheel does not have a tendency to lock—the inertia wheel will swivel back again, with respect to the driving member and allow the inlet valve to open again. Even if the rocker arm were brought to its central flipping point, it could not remain there if the inertia wheel were to swivel back since the catch 10 on the inertia wheel would provide tension to the U-spring 9 which would, in turn, flip the top of the rocker arm toward the left.

If, on the other hand, the wheel in question does have a tendency to lock, the rotational deceleration thereof will continue to increase. The contact spring 22 and the flat spring 12a will be bent further toward the right by the projection 14 and the bead 20, respectively, and the catch 10 will, at time $t_2$, flip the rocker arm into its right-hand position or stable state. As a result, the D2-contact (FIG. 3) will close and cause the brake pressure to drop. The pulling spring 8 will hold the rocker arm in this right-hand state even though the rotational deceleration of the wheel will ultimately drop as a result of the reduction in brake pressure, and the inertia wheel, especially under the force of the flat spring 12a, will be caused to move back into the position shown in FIG. 2.

If the wheel now accelerates again, the inertia wheel will rotate in the reverse direction as shown by the arrow in FIG. 4. The catch 11 will then come in contact with the rocker arm and move it back toward the left against the force of the pulling spring 8. The U-spring 9, which has previously been tensioned by the catch 10, is not strong enough by itself to move the rocker arm against the force of the spring 8. When, however, the catch 11 has swiveled the rocker arm to its center or flipping position, the U-spring will provide sufficient force to flip the rocker arm into its normal position even if the inertia wheel were at this instant to move back again toward the right. Under no circumstances, therefore, will the rocker arm be able to remain in its central position between the stable states.

Before the D2-contact opens again, the A-contact will close. The A-contact thus undertakes to maintain the excitation of the inlet valve so that this valve will remain closed. At time $t_3$ (FIG. 1) the D2-contact opens, the rocker arm falls back into its normal position and the outlet valve closes. The brake pressure P will then remain constant so long as the acceleration of the wheel is sufficiently high to keep the A-contact closed. When the acceleration of the wheel finally falls below the threshold value at time $t_4$, the spring 12b will rotate the inertia wheel back to its normal position and cause the A-contact as well as the inlet valve to open. The brake control regulating cycle has then been completed.

If the wheel acceleration were to continue to sharply rise, after the time $t_3$, for example, because the brake pressure had been reduced too far or because the pavement happened at that moment to have an especially high coefficient of friction, the inertia wheel would then be moved so far to the left, as shown by the arrow in FIG. 5, that the contact bead 20 would move past the contact spring 24 and open the A-contact. The inlet valve could therefore be allowed to open momentarily so that the brake pressure applied to the vehicle wheel could increase somewhat. This would cause the rotational acceleration of the wheel to be reduced. When the inertia wheel were to finally move back toward the right under the force of the flat spring 12b, the wiper A-contact would close again for a short time and hold the brake pressure again at a constant level. As the vehicle wheel finally approached the speed of the vehicle, its rotational acceleration would decrease still further and allow the inertia wheel to move back to its normal position as shown in FIG. 2.

If the wheel were to come to a standstill with a jolt at the end of the braking process—for example, when the vehicle reached the last yard of its stopping distance after being braked hard from a high speed—the rocker arm would remain in its right-hand position only until such time as the brake pressure were reduced to a few atmospheres. The pressure switch PS would open, at this moment, disconnecting the power to the solenoid inlet and outlet valves as well as the sensor magnet 29. The restoring lever 26 would then move toward the right under the force of its spring, press against the lower half of the U-spring 9 and force the rocker arm back into its normal position toward the left.

Figure 7:
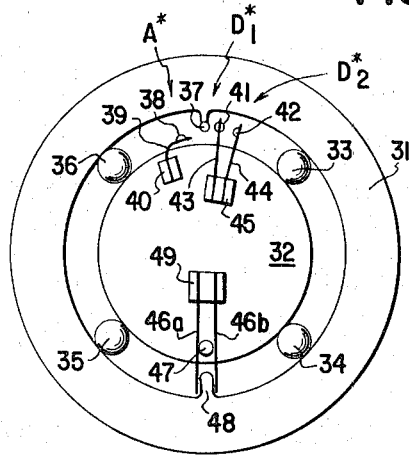
FIG. 7 is a schematic diagram of another mechanical sensor, according to the present invention, which is considerably simpler than the sensor shown in FIGS. 2 through 5.

FIG. 7 shows another embodiment of a mechanical sensor according to the present invention which is of considerably simpler construction than the sensor of FIGS. 2—5. This sensor again includes an inertia wheel 31, a driving member 32 as well as means schematically indicated by the ball bearings 33, 34, 35 and 36 for rotatably mounting the inertia wheel and the driving member with respect to each other. A contact bead 37 is again mounted on the inertia wheel and arranged to brush by a contact bead 38 when the wheel accelerates. The bead 38 is fixed to a contact spring 39 that is fastened to the driving member 32 by means of a clamping block 40. The contact beads 37 and 38 operate together to form the so-called A*-contact.

If the inertia wheel moves toward the right or clockwise with respect to the driving member, the contact bead 37 will first press against the contact bead 41 and then, if the inertia wheel moves further in this direction, force the bead 41 against a bead 42. An electrically conductive connection between beads 37 and 41 will be designated, in the description that follows, as a closed D*1-contact. A conductive connection between beads 37, 41 and 42 will mean that the so-called D*2-contact is closed.

The contact beads 41 and 42 are mounted at the end of two extended contact springs 43 and 44, respectively, that are fastened to the driving member 32 by means of a common clamping block 45.

The "normal position" of the inertia wheel is determined by a projection 48 and two flat return springs 46a and 46b. The two springs, which are arranged to contact both sides of the projection 48, are fastened to the driving member 32 by a common clamping block 49. These flat springs lie under tension against a driving member stop pin 47, also attached to the driving member.

Figure 8:
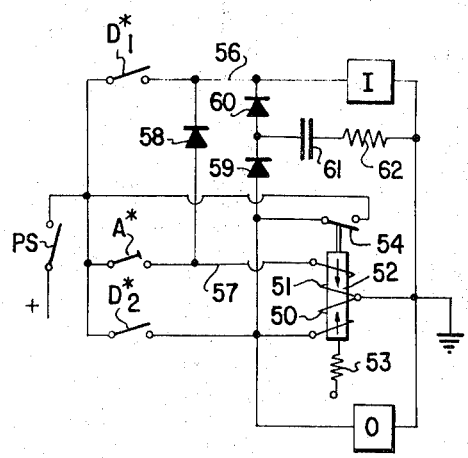
FIG. 8 is a schematic diagram of the electric circuit of a control system for preventing wheel locking, according to another embodiment of the present invention, which employs the sensor shown in FIG. 7. This circuit has a double-coil relay which serves as the bistable device.

The sensor shown in FIG. 7 may be employed to realize the present invention, for example, with a circuit of the type shown schematically in FIG. 8. This circuit includes a pressure switch PS which corresponds in function and operates in the identical manner to the corresponding pressure switch in the circuit of FIG. 6. The heart of the circuit is a double-winding relay with a holding winding 50 which moves a common magnet armature 52 upward in the direction shown by the arrow beneath the winding 50 against the force of a restoring spring 53, when in the upper position the armature closes a holding contact 54. A return winding 51 is also arranged about the armature; this winding is so dimensioned that it is able, when excited, to move the armature downward, in the direction of the upper arrow, against the force produced by the holding winding 50. When it moves downward, the armature opens the holding contact 54.

The circuit of FIG. 8 includes three separate parallel branches between the plus terminal and ground. The first branch includes the D*1-contact in series with the inlet valve I. The second branch includes the A*-contact in series with the return winding 51, and the third branch includes the D*2-contact in series with the holding winding 50. The outlet valve O lies in parallel with the holding winding 50, and the holding contact 54 lies in parallel with the D*2-contact.

The conductor 56 which interconnects the D*1-contact and the inlet valve and the conductor 57 between the A*-contact and the return winding 51 are connected with each other through a diode 58. This diode is poled so that the inlet valve will be excited whenever the A*-contact is closed. The conductor interconnecting the D*2-contact with the holding contact is also connected to the conductor 56 through two diodes 59 and 60. The point joining these two diodes is connected through a capacitor 61 and a resistor 62 to ground. This RC-series circuit forms a short time delay device to hold the inlet valve closed. The diodes 59 and 60 are poled in such a way that the inlet valve will be excited and the capacitor 61 will be charged whenever the D*2-contact is closed. On the other hand, when the D*1-contact is closed, the capacitor 61 does not receive a charge.

The sensor of FIG. 7 cooperates with the circuit of FIG. 8 to operate in the following manner. Under normal conditions all three sensor contacts as well as the holding contact 54 are open. When the vehicle is braked, the pressure switch PS will close and provide voltage for the sensor contacts. If the wheel which is being sensed decelerates at a rate which exceeds a given threshold, the D*1-contact will initially close, thereby closing the inlet valve and maintaining the brake pressure applied to the wheel at a constant level. If the rotational deceleration of the wheel increases still further and exceeds a second threshold, the D*2-contact will also close and apply voltage to the outlet valve O and the holding winding 50. A charge will also be simultaneously supplied through the diode 59 to the capacitor 61. The armature 52 will move upward and close the holding contact 54. This holding contact ensures that the armature will remain in the upper position after the D*2-contact opens again when the brake pressure has dropped and the rotational deceleration of the wheel has been reduced. Even after the deceleration of the wheel has been reduced so far as to allow the D*1-contact to open, both the inlet and outlet valves will continue to receive excitation current and cause the brake pressure to continue to drop.

When the wheel has finally begun to accelerate and the acceleration has risen above a prescribed threshold, the A*-contact will close and provide a voltage to the conductor 57. This voltage is transmitted to the return winding 51 and through the diode 58 to the inlet valve I. The armature 52 of the double-winding relay will then be forced downward opening the holding contact 54. The outlet valve will close and hold the brake pressure at a constant level until the A*-contact opens either as a result of a further rotation of the inertia wheel 31 or because the inertia wheel returns to its normal position.

If the inlet and outlet valves remain excited and cause the brake pressure to fall to but a few atmospheres, the pressure switch PS will automatically open removing the excitation from both the inlet and outlet valves as well as the holding winding 50. The armature 52 will then be returned to its initial (lower) position exclusively by force of the spring 53. The operation of this embodiment of FIGS. 7 and 8 is therefore the same, in principle, as the operation of the embodiments of FIGS. 2 through 6, described above. The particular function of the short time delay device 61 and 62 will be described at the end of and in connection with the following description of the embodiment of the brake control system of FIGS. 7 and 10.

Figure 9:
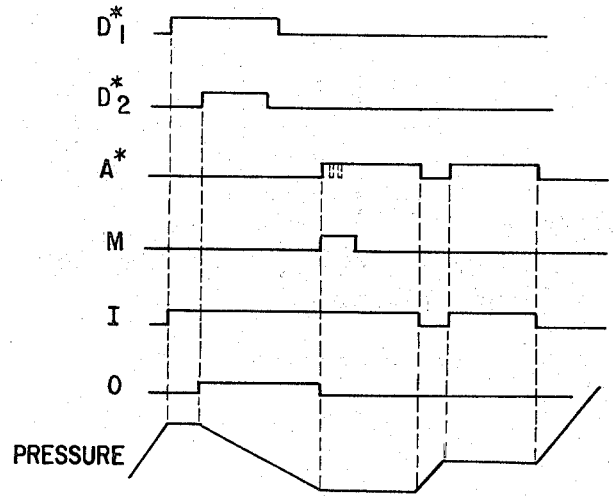
FIG. 9 is a diagram showing the signals which appear at various points of the circuit of FIG. 10.
Figure 10:
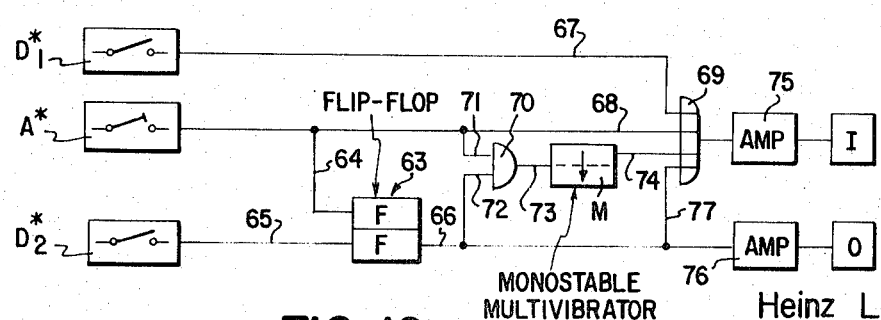
FIG. 10 is a block diagram of the electric circuit of a control system for preventing wheel locking, according to still another embodiment of the present invention. This circuit employs the sensor of FIG. 7 and a flip-flop as the bistable device.

FIG. 9 is a pulse diagram which shows the instantaneous switching condition of the individual elements of the block diagram of FIG. 10 during a complete cycle of operation. FIG. 10 schematically shows a logic circuit which, when combined with the sensor of FIG. 7, forms the electrical portion of the control system for preventing wheel locking, according to another embodiment of the present invention. Element 63 is a flip-flop which has inputs 64 and 65 and an output 66. When this flip-flop is in one of its two stable states, a potential is present at the output 66; when it is in the other of its two stable states, the output 66 is at zero potential. The flip-flop can be flipped into the stable state which produces a potential at the output 66 by a continuous signal or a pulse of any length applied to the input 65. Once the flip-flop is in this state, additional pulses applied to the input 65 do not change its state. On the other hand, when the flip-flop is in this output-producing state, the first pulse that appears at the input 64 will flip it to the opposite stable state. A subsequent pulse applied to the input 65 will return it to the first state, etc.

The circuit of FIG. 10 also includes an OR-gate 69 with four inputs 67, 68, 74 and 77. A potential appears at the output of this gate when a potential appears at one or more of its inputs. The circuit of FIG. 10 also includes an AND-gate 70 with two inputs 71 and 72 and an output 73. This gate is operative to produce a potential at the output 73 if and only if a potential appears at both inputs 71 and 72 simultaneously. Connected to the output of the AND-gate is a monostable multivibrator M. The output 74 of this circuit M is normally at zero potential. However, if a short pulse appears at the input 73 of this circuit, it is raised into an unstable state and produces a potential at the output 74. After a predetermined fixed time, here, for example, after 25 milliseconds, the circuit M falls back into its initial stable state.

The outputs of the OR-gate 69 and the flip-flop 63 are supplied to the inlet and outlet valves through two electronic amplifiers 75 and 76, respectively. The input 77 of the OR-gate 69 is also connected to the output of the flip-flop.

The three contacts of the sensor of FIG. 7 are illustrated in block form and are designated with the same reference letters that appear in FIG. 7. The D*1-contact and the A*-contact are connected to the inputs 67 and 68, respectively, of the OR-gate. The A*-contact is also connected to the input 64 and the D*2-contact is connected to the input 65 of the flip-flop. The inputs 71 and 72 of the AND-gate, finally, are connected to the A*-contact and to the output 66 of the flip-flop, respectively.

The operation of the embodiment of the control system for preventing wheel locking shown in FIGS. 7 and 10 will now be described with reference to FIG. 9. It is assumed again that the vehicle wheel which is sensed by the sensor of FIG. 7 is initially braked with a pressure that is insufficient to cause it to lock, that all three sensor contacts are open and that the flip-flop 63 is in the state which produces no potential at its output 66. If too much brake pressure is then applied to the wheel, the wheel's rotational deceleration will exceed a first threshold and cause the D 1-contact to close. As a result, a signal will pass through the OR-gate 69 and the amplifier 75 to close the inlet valve I and hold the brake pressure constant. If the wheel decelerates further, the D*2-contact will also close and send a signal to the input 65 of the flip-flop 63. This signal will cause the flip-flop to change its state and produce a potential at its output 66. This potential will be amplified in the amplifier 76 and applied to the outlet valve O; the latter will open and reduce the brake pressure.

The potential on the output 66 will also be passed to the input 77 of the OR-gate 69. Thus, when the deceleration contacts D*₁ and D*₂ open again, both the inlet valve and outlet valve will remain closed and open, respectively.

When the wheel is finally allowed to accelerate as a result of the continuing drop in brake pressure, and this acceleration exceeds a certain threshold, the A*-contact will close and cause the flip-flop 63 to return to its initial state. The outlet valve will close, as a result; however, the potential applied by the A*-contact to the input 68 of the OR-gate will maintain the inlet valve in the closed position. If the acceleration of the wheel increases still further, causing the signal on the input 68 to fall, the inlet valve will open, as shown in FIG. 9, and allow the pressure to increase to a higher step. When the wheel acceleration falls again, the A*-contact will close and reactuate the inlet valve. The brake pressure will thus be maintained at this new constant level until the rotational speed of the wheel approaches the speed of the vehicle and its acceleration finally falls below the given threshold.

As was mentioned above in the "Summary of the Invention," it is possible that variations in the acceleration of the wheel could occur immediately after the reduction in brake pressure. These variations would cause interruptions in the acceleration signal that would be undesirable, at least during the time immediately after the reduction in pressure. Two such interruptions are indicated in dotted lines in the signal produced by the A*-contact on the line A* in FIG. 9.

The monostable multivibrator M in the circuit of FIG. 10 operates to prevent the undesired interruptions in the A*-contact signal from reaching the inlet valve. Whenever the acceleration signal is first initiated, there appears a potential at both the input 71 and the input 72 of the AND-gate 70. This AND-gate therefore emits a pulse which flips the multivibrator M into its unstable state. The multivibrator M remains in this state for 25 milliseconds producing an output during this time on line 74 which maintains the inlet valve in the closed position even when the signal A* intermittently disappears. The line M in FIG. 9 shows the delay time of the monostable multivibrator. Since a potential will not appear again on the input 72 of the AND-gate 70 until the next cycle of operation of the control system for preventing wheel locking, the monostable flip-flop will only be actuated a single time per cycle.

The short time delay device 61 and 62 in the circuit of FIG. 8 achieves the same effect as the monostable multivibrator of FIG. 10. The capacitor 61 will be charged, as described, while the brake pressure is being reduced and will discharge through the diode 60 and the inlet valve immediately thereafter. This maintains the inlet valve in the actuated state even if variations in the acceleration of the wheel cause interruptions in the current passing through the A*-contact.

It will be noted that with the exception of the line M the pulse diagram of FIG. 9 can also be applied to explain the operation of the circuit of FIG. 8. In practice, the interruptions in the A*-signal usually occur more than once, that is, for example, from two to five times during a single control cycle.

It will be understood that the above description of the present invention is susceptible to various modifications, changes and adaptations, and the same are intended to be comprehended within the meaning and range of equivalents of the appended claims.

We claim:

1. In a fluid actuated brake system for applying a braking force to a wheel, which system has a source of fluid pressure connected to the wheel brake, a sink of fluid pressure connected to the wheel brake, inlet valve means connected between the source and the wheel brake for selectively preventing the fluid pressure from the source from reaching the wheel brake, outlet valve means connected between the sink and the wheel brake for selectively permitting the fluid pressure from the wheel brake to escape to the sink, and control means connected to the inlet valve means and the outlet valve means for selectively (1) opening the inlet valve means and closing the outlet valve means to increase the brake pressure; (2) closing both the inlet and the outlet valve means to hold the brake pressure constant; and (3) closing the inlet valve means and opening the outlet valve means to reduce the braking force applied to the wheel, the improvement wherein said control means comprises:
   a. bistable means, switchable between two stable states, for closing said inlet valve means and opening said outlet valve means when in one of said stable states; and for closing the outlet valve means when in the other of said two stable states;
   b. first means for switching said bistable means into said one stable state when the rotational deceleration of the wheel exceeds a first threshold;
   c. second means for switching said bistable means into said other of said two stable states and for causing said inlet valve means to continue to be closed when the rotational acceleration of the wheel exceeds a second threshold; and,
   d. third means for opening said inlet valve means when the rotational acceleration of the wheel exceeds a third threshold which is higher than said second threshold.

2. In a fluid actuated brake system for applying a braking force to a wheel, which system has a source of fluid pressure connected to the wheel brake, a sink of fluid pressure connected to the wheel brake, inlet valve means connected between the source and the wheel brake for selectively preventing the fluid pressure from the source from reaching the wheel brake, outlet valve means connected between the sink and the wheel brake for selectively permitting the fluid pressure from the wheel brake to escape to the sink, and control means connected to the inlet valve means and the outlet valve means for selectively closing the inlet valve means and opening the outlet valve means to selectively hold constant and reduce the braking force applied to the wheel, the improvement wherein said control means comprises:
   a. bistable means, switchable between two stable states, for closing said inlet valve means and opening said outlet valve means when in one of said stable states to reduce the braking force applied to the wheel said bistable means including rocker arm means arranged to be held in either of said two stable states and arranged to actuate an electrical contact when in one of said two states;
   b. first means for switching said bistable means into said one stable state when the rotational deceleration of the wheel exceeds a first threshold; and
   c. second means for switching said bistable means into said other of said two stable states when the rotational acceleration of the wheel exceeds a second threshold.

3. The improvement defined in claim 2, wherein said rocker arm is held in either of said two states by the force of a spring.

4. The improvement defined in claim 2, wherein said first and second switching means include an inertia member, arranged to move relative to said rocker arm in response to rotational decelerations and accelerations of said wheel.

5. The improvement defined in claim 4, wherein said inertia member includes two catch means, spaced apart and arranged on both sides of said rocker arm means, for moving said rocker arm means into an opposite stable state.

6. The improvement defined in claim 4, wherein said bistable means further includes an elastic connection between said rocker arm means and said inertia member for preventing said rocker arm means from remaining in a labile state.

7. The improvement defined in claim 1, wherein said bistable means includes electrical relay means comprising, in combination:
   1. an armature arranged to move between two end positions;
   2. an electrical contact connected to said armature and arranged to close when said armature is in one of said two positions and to open when said armature is in the other of said two positions;
   3. first winding means, electrically connected to said electrical contact, for holding said armature in said one position; and
   4. second winding means for moving said armature from said one position to said other position against the force of said first winding means.

8. The improvement defined in claim 1, wherein said bistable means includes an electronic bistable multivibrator.

9. In a fluid actuated brake system for applying a braking force to a wheel, which system has a source of fluid pressure connected to the wheel brake, a sink of fluid pressure connected to the wheel brake, inlet valve means connected between the source and the wheel brake for selectively preventing the fluid pressure from the source from reaching the wheel brake, outlet valve means connected between the sink and the wheel brake for selectively permitting the fluid pressure from the wheel brake to escape to the sink, and control means connected to the inlet valve means and the outlet valve means for selectively closing the inlet valve means and opening the outlet valve means to selectively hold constant and reduce the braking force applied to the wheel, the improvement wherein said control means comprises:
   a. bistable means, switchable between two stable states, for closing said inlet valve means and opening said outlet valve means when in one of said stable states to reduce the braking force applied to the wheel;
   b. first means for switching said bistable means into said one stable state when the rotational deceleration of the wheel exceeds a first threshold;
   c. second means for switching said bistable means into said other of said two stable states when the rotational acceleration of the wheel exceeds a second threshold; and,
   d. third means for causing said inlet and said outlet valve means to be closed to hold said braking force substantially constant when the rotational acceleration of the wheel exceeds said second threshold, said third means further including electrical switch means for causing said inlet valve means to be opened and said outlet valve means to be closed to allow said braking force to increase when the rotational acceleration of the wheel exceeds a third threshold that is higher than said second threshold, said electrical switch means being switchable between two positions, said switch means, when in one of said positions, causing said inlet and outlet valve means to be closed and, when in the other of said positions, causing said inlet valve means to be opened and said outlet valve means to be closed, said electrical switch means including two electrical contacts and an inertia member arranged to move one of said contacts with respect to the other in response to the rotational accelerations and decelerations of said wheel, thereby causing said one contact to wipe against said other contact when the rotational acceleration of said wheel falls within a given range.

10. The improvement defined in claim 9, wherein said one position is the position where said two contacts are in electrical contact and said other position is the position where said two contacts are not in electrical contact.

11. The improvement defined in claim 1, wherein said control means further comprises a fourth means for holding said inlet valve in the closed position for a given delay time after the rotational acceleration of the wheel exceeds said second threshold.

12. The improvement defined in claim 1, wherein said control means further comprises a fourth means for switching said bistable means into said other of said two stable states when the fluid pressure applied to the wheel brake falls below a given level.

13. In a fluid actuated brake system for applying a braking force to a wheel, which system has a source of fluid pressure connected to the wheel brake, a sink of fluid pressure connected to the wheel brake, inlet valve means connected between the source and the wheel brake for selectively preventing the fluid pressure from the source from reaching the wheel brake, outlet valve means connected between the sink and the wheel brake for selectively permitting the fluid pressure from the wheel brake to escape to the sink, and control means connected to the inlet valve means and the outlet valve means for selectively closing the inlet valve means and opening the outlet valve means to selectively hold constant and reduce the braking force applied to the wheel, the improvement wherein said control means comprises:
   a. bistable means, switchable between two stable states, for closing said inlet valve means and opening said outlet valve means when in one of said stable states to reduce the braking force applied to the wheel;
   b. first means for switching said bistable means into said one stable state when the rotational deceleration of the wheel exceeds a first threshold;
   c. second means for switching said bistable means into said other of said two stable states when the rotational acceleration of the wheel exceeds a second threshold; and
   d. third means for switching said bistable means into said other of said two stable states when the fluid pressure applied to the wheel brake falls below a given level; third means includes fourth means responsive to the absence of an electrical signal for switching said bistable means into the other of said two stable states and pressure switch means, connected to sense the fluid pressure applied to said wheel brake, for providing an electrical signal to said fourth means when said fluid pressure lies above said given level.

14. The improvement defined in claim 13, wherein said bistable means includes rocker arm means and said fourth means includes a restoring lever, restoring spring means for pressing said restoring lever against said rocker arm means to force and hold said rocker arm means in the other of said two stable states, and electromagnet means connected to said pressure switch means for drawing said restoring lever away from said rocker arm means, in response to said electrical signal, thereby to allow said rocker arm means to switch into and remain in said one stable state.